United States Patent [19]

Tamburello

[11] 3,955,600
[45] May 11, 1976

[54] COMPOSITE PIPELINE

[75] Inventor: Russell D. Tamburello, Daly City, Calif.

[73] Assignee: Bechtel International Corporation, San Francisco, Calif.

[22] Filed: May 8, 1973

[21] Appl. No.: 358,326

Related U.S. Application Data

[63] Continuation-in-part of Ser. No. 150,633, June 7, 1971, abandoned.

[52] U.S. Cl............................. 138/141; 138/147; 138/153; 138/175; 138/DIG. 2
[51] Int. Cl.²...................... F16L 9/14; F16L 9/18
[58] Field of Search .......... 138/141, 144, 147, 153, 138/172, 174, 175, DIG. 2, DIG. 5, DIG. 7; 156/330; 161/185, 186, 193, 207

[56] References Cited
UNITED STATES PATENTS

| 779,169 | 1/1905 | MacDonald | 138/175 X |
|---|---|---|---|
| 912,885 | 2/1909 | Phelan | 138/175 |
| 1,549,406 | 8/1925 | DeLaMare | 138/153 X |
| 1,892,433 | 12/1932 | Huff | 138/175 X |
| 2,070,888 | 2/1937 | Eschenbrenner | 138/147 X |
| 2,243,273 | 5/1941 | Edwards | 138/153 X |
| 2,326,010 | 8/1943 | Crom | 138/174 UX |
| 2,933,917 | 4/1960 | Sampson | 138/147 X |
| 3,002,534 | 10/1961 | Noland | 138/DIG. 2 |
| 3,076,481 | 2/1963 | Wygant | 138/153 X |
| 3,168,297 | 2/1965 | Brough | 138/147 X |
| 3,381,718 | 5/1968 | Darrow | 138/141 |
| 3,532,132 | 10/1970 | Rubenstein | 138/141 X |
| 3,599,435 | 8/1971 | Kolb | 138/141 X |

Primary Examiner—Richard C. Queisser
Assistant Examiner—Charles Gorenstein

[57] ABSTRACT

This invention relates to a composite pipeline to be used in a submerged condition, usually in deep water. In accordance with this invention, the composite pipeline comprises a pipeline through which a fluid flows, e.g., oil, gas or a slurry; to provide for electrolytic protection, the pipeline includes a suitable coating or wrapping; finally, to enable the pipeline to be maintained in a submerged condition, an outer coating of concrete is provided about the wrapping. Further and in accordance with this invention, the concrete coating is integrally bonded to the pipeline in such fashion that the three element structure so provided can be said to be a composite structure rather than one made up of three separate elements. Because the composite structure pipeline is structurally one, it is possible to use a lighter weight of material in the pipeline with the result that a saving of as much as two-thirds of the pipeline weight is achieved.

10 Claims, 7 Drawing Figures

INVENTOR.
RUSSELL D. TAMBURELLO
BY
ATTORNEYS

COMPOSITE PIPELINE

BACKGROUND OF THE INVENTION

This application is a continuation-in-part application of co-pending application Ser. No. 150,633, filed June 7, 1971, now abandoned, entitled COMPOSITE PIPELINE.

It has been known heretofore to apply concrete to a pipeline to maintain the latter submerged in water. However, heretofore the concrete has merely been provided in such a manner that it only served as a weight to overcome the buoyant effect of the pipeline and to keep the pipeline from moving under the action of waves and current. The concrete was not considered to contribute to the structural integrity of the pipeline, only having sufficient structural strength to withstand the handling loads during installation and to remain intact during the life expectancy of the pipeline while in its final laid position.

SUMMARY OF THE INVENTION

The composite pipeline of this invention provides several economic advantages. Thus up to two-thirds of the material used in the pipeline can be eliminated to provide a composite pipeline comparable to those in use at the present time. Further, up to half the manhours are eliminated in fabricating the carrier and further, the time required to string and lay the pipeline is reduced by at least half.

By utilizing the composite pipeline of this invention, the pipe wrap and the weight coating jacket contribute to both the strength and rigidity of the pipe which they surround. The numerical calculations in determining the strength and rigidity of the pipeline are closer to what is actually experienced in laying operations and by tests than was possible before the present invention. Finally, the abrasion of the wrap by the weight coating jacket is virtually eliminated, thus enhancing the life expectancy of the barrier to electrical currents and corrosion which are detrimental to the life expectancy of the pipeline. Further, a closer balance of design is achieved in the pipeline for all the loading conditions on the pipeline throughout its useful life. Finally, all materials used in the pipeline act as a structural unit for the critical loading conditions, rather than independently, as is the case in present pipelines.

DESCRIPTION OF THE PREFERRED EMBODIMENT

In the preferred embodiment, the composite pipeline includes the pipe 6 which may be of metal plastic or other suitable material. Applied about the surface of the pipe is a coating or wrap 7 to protect the pipeline against electrolytic corrosion. One coating is made of two layers of glass fiber held in place with either a coal tar or a bitumastic binder and applied as a coating.

Figure 1:
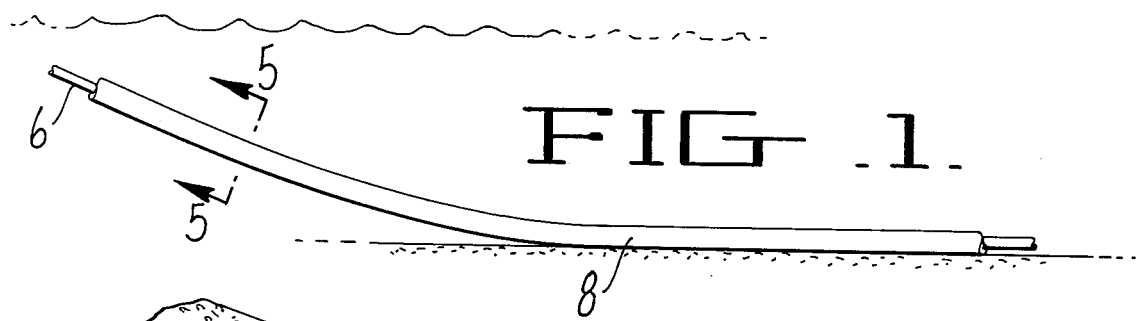
FIG. 1 is a side elevation showing a position of the pipeline of this invention in use and wherein a portion of the pipeline lays on the sea floor with at least one end extending to above the surface of the sea.
Figure 2:
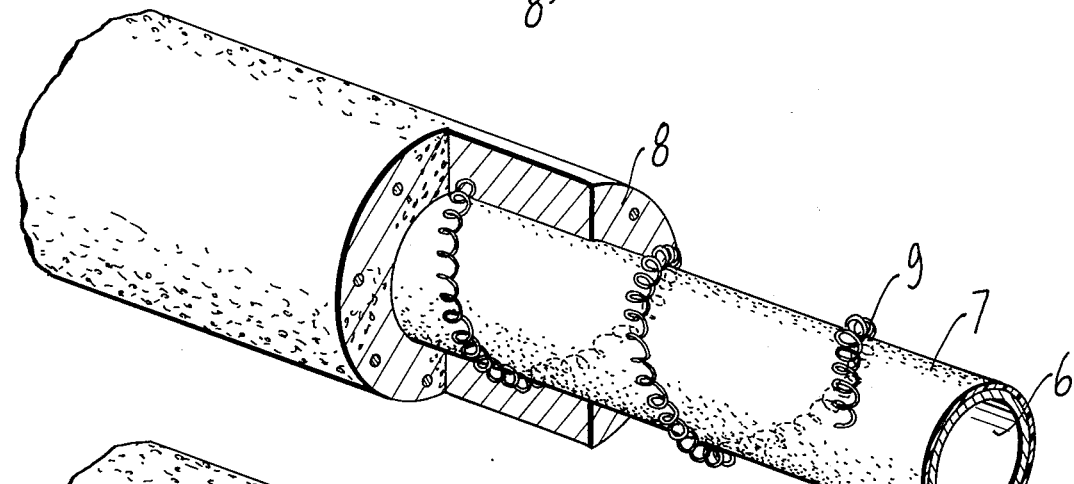
FIGS. 2, 3 and 4 are, respectively, perspectives showing various modifications of the composite pipeline of this invention.
Figure 3:
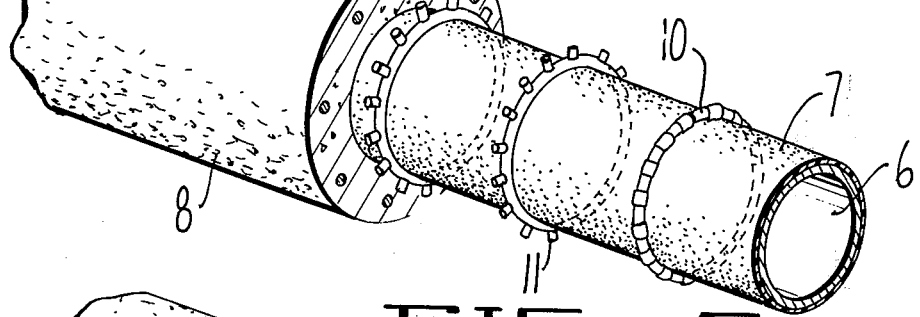
Figure 4:
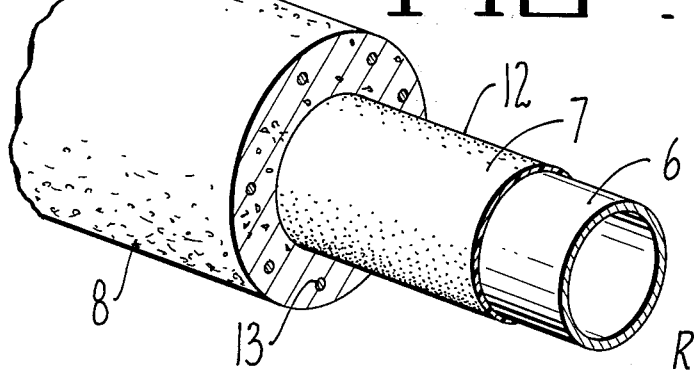

In accordance with this invention, an outer layer of concrete, generally indicated at 8, is applied over the coating or wrap and in such fashion that, together with the pipeline, they form a composite structure. This is achieved by utilizing shear transfer devices between the pipe and the concrete. These can be mechanical means such as spiral wire 9 as shown in FIGS. 2 3 and 4, expanded metal 10 as in FIGS. 3 and 6 or shear lugs 11 as in FIG. 3. These are secured in place on the pipe by welding or with an adhesive before coating or wrap and the concrete are applied. One can also use a structural adhesive 12 as in FIG. 4, either in lieu of the coating or wrap or in conjunction with the coating or wrap, and which bonds to the steel and to the freshly poured concrete. The structural adhesives include water insensitive thermal setting resins such as epoxy resins. These structural adhesives are well-known and the invention is not limited to epoxy resins alone. In each instance, the concrete includes suitable reinforcing, generally indicated at 13a and 13b. This can be provided as such in spaced relation to the pipe proper, as in FIG. 5, or can be attached as by spacers 14 to the pipe proper.

In the following, I have set forth the details of four different pipelines comparing the structure of the composite pipeline with that of the contemporary pipeline constructed in accordance with the usual practice heretofore. In each instance the pipe utilized was of the same yield strength.

CASE I

A gas pipeline, 30'' in diameter and of a yield strength of 75,000 psi, operating at 1,000 psi to be located in 130 ft. of water.

| Contemporary Pipeline | Composite Pipeline |
|---|---|
| 0.562'' Wall | 0.33'' Wall |
| 2.6'' of 140 lb. concrete | 4'' of 140 lb. concrete |

CASE II

A 42'' oil line of 52,000 psi yield strength, operating at 400 psi in 130 ft. of water.

| Contemporary Pipeline | Composite Pipeline |
|---|---|
| 0.625'' Wall | 0.312'' Wall |
| 2.8'' of 190 lb. concrete | 4.0'' of 190 lb. concrete |

CASE III

A 60'' pipeline of 75,000 psi yield strength, operating at 275 psi in 130 ft. of water.

| Contemporary Pipeline | Composite Pipeline |
|---|---|
| 0.875'' Wall | 0.312'' Wall |
| 5.4'' of 165 lb. concrete | 8.0'' of 165 lb. concrete |

CASE IV

A 36'' oil line of 36,000 psi yield strength, operating at 275 psi in 65 ft. of water.

| Contemporary Pipeline | Composite Pipeline |
|---|---|
| 0.438" Wall | 0.312" Wall |
| 4.5" of 140 lb. concrete | 4.8" of 140 lb. concrete |

The methods of determining the stresses at any point in a pipeline or riser are well-known and fall essentially into three categories, i.e., the determination of stresses in the circumferential direction, the determination of stresses in the longitudinal direction, and the resulting allowable biaxial and triaxial stresses.

The allowable stresses in a pipeline are determined in the same manner as determining the allowable stresses in a long cylinder. The methods of determining the allowable stresses are either obtained from the applicable codes or by applying the appropriate factors of safety to the critical buckling stress as determined by methods described in published literature or to the yield strength of the material, whichever governs.

A brief description of the method of calculating stresses in the composite pipeline or riser is as follows:

1. Circumferential Stresses — Determination of circumferential stress is critical with respect to the concrete jacket thickness, i.e.,
   a. For relatively thick concrete jackets, it can be assumed that the carrier is to resist all of the internal pressure, less the external water pressure, during operation; and it will resist all of the external water pressure until it produces a stress that is a finite percentage of tensile yield (normal factor of safety included in tension), since the cylinder of the pipe can be considered as stabilized by the concrete jacket. This method of determining the allowable stress levels is very conservative.
   b. For intermediate and thin concrete jacket thicknesses, it can be assumed that the concrete jacket acting in unison with the steel increases the effective wall thickness of the carrier to prevent buckling. It is this increased effective wall thickness that is used in determining the buckling pressure of the carrier as a composite member under a external head (see bending tests). This is a logical, but conservative, method of determining the allowable stress levels and will equal the finite percentage of tensile yield of (a) above.
   c. For a thin concrete jacket thickness, it can be assumed that both the steel and the concrete, since they have a shear transfer capability between them, can take their share of the external loading which will put both the carrier and weight coated jacket into compression. This assumption when the thickness is critical would permit further reductions in the wall thickness requirements, considerably below that of the present state of the art in determining the allowable wall thickness of pipe under external heads and that of (b) above.

2. Longitudinal Stresses
   a. It can be assumed that the carrier is to resist all axial loads applied to the pipeline but will be able to carry greater biaxial stresses, i.e., in combination with the external pressure loads, than that possible heretofore. This is possible since the weight coating jacket will stabilize the carrier. The added stabilization is achieved since the effective wall thickness of the carrier has been greatly increased.
   b. It can be assumed that the carrier, wrap and weight coating jacket act as a unit, hence are able to resist greater amounts of bending forces due to laying operations and bridging that takes place when erosion occurs under the pipeline.

3. Biaxial and Triaxial Stresses

Buckling is no longer the critical mode of failure and the controlling combined stresses are based on principal stresses only.

The advantages of the composite pipeline and carrier are realized through the added stability to the carrier by the composite action of the carrier, wrap or corrosion barrier, and weight coating jacket. This added stability permits greater allowable stresses in the carrier and facilitates prestressing without damaging the concrete. This is particularly the case for the allowable stress in the circumferential direction. In the case of the allowable stresses in the longitudinal direction, the added higher allowable stress in the carrier will be realized. However, since construction joints will have to be included throughout the length of the carriers, there will be small, weak spots temporarily developed at construction joints with respect to longitudinal bending only. This can be compensated for by simply considering the plastic flow of the carrier and the inherent behavior of concrete; i.e., by using a control concrete, say with a vacuum form system, and the use of retarding densifiers, the shrinkage can be considerably reduced.

Further, since there is a shear transfer capability, the shrinkage can then take the form of putting the concrete into a mild tensile state. As the pipeline is inserted into the water, the concrete will once again swell, thus possibly eliminating completely the tensile stress and conceivably placing concrete in a compressive state. This condition would greatly assist in keeping the pipe from being damaged in the event that it is subjected to external forces greater than anticipated in the pipeline design criteria, such as hurricanes, bridging or other unexpected event.

The composite pipeline can be used with any of the present day known methods of placing or laying pipe, i.e., lay barge, pulling from shore, floating and then sinking in place, placing sections and sinking in place, etcetera, including any methods that employ a pretensioning procedure. Pretensioning is possible since the composite section is capable of transferring shear loads from the rollers, belts, etcetera, to the pipe without damaging the pipe.

I claim:

1. A composite pipeline comprising an elongate pipe of lightweight, load bearing material having a cylindrical outer surface, a coating of two layers of glass fiber on the entire outer surface of the pipe, and a thick layer of load bearing, reinforced concrete cast in place directly on the coating around the pipe, said layer of concrete having a thickness at least ten times as thick as the thickness of the pipe, and said pipe, said coating and said layer of concrete all integrally bonded together, thus resulting in an integral composite pipeline.

2. A composite pipeline comprising an elongate, cylindrical, load bearing steel pipe, at least one layer of glass fibers bonded to the entire outer surface of the steel pipe, a layer of structural adhesive bonded to the entire outer surface of the glass fibers, and a thick layer of load bearing, reinforced concrete cast in place directly on the layer of adhesive around the pipe, said layer of concrete having a thickness several times as thick as the thickness of the steel pipe, and said pipe, said layer of adhesive, said layer of glass fibers and said layer of concrete all integrally bonded together, thus resulting in an integral, composite pipeline of substantial strength and load bearing ability.

3. A composite pipeline as in claim 2, wherein there are two layers of glass fibers on the outer surface of the steel pipe, and said steel pipe has a wall thickness of from about 0.312 inches to about 0.33 inches, and said layer of concrete has a thickness of from about 4.0 inches to about 8.0 inches.

4. A composite pipe as in claim 3, wherein the composite pipeline has an overall diameter of from about 30 inches up to about 60 inches.

5. A composite pipeline as in claim 2, wherein the structural adhesive comprises a water insensitive thermal setting resin, said structural adhesive comprising a shear transfer means between the pipe and layer of concrete, so that as the cast in place concrete cures, it shrinks, thus placing the concrete under tension, and when the pipeline is submerged in a body of water, the concrete swells and the tensile stress on the concrete is thus eliminated.

6. A composite pipeline as in claim 2, wherein a wrapper is applied to the outer surface of the steel pipe to protect the pipe against electrolytic corrosion, reinforcing means secured to the outer surface of the steel pipe and extending into the layer of concrete, said reinforcing means comprising a spiral wire spirally wound around the pipe and secured to the outer surface of the pipe prior to application of the wrapper and concrete, and said reinforcing means comprising a shear transfer means.

7. A composite pipeline as in claim 6, wherein the spiral wire is welded to the pipe.

8. A composite pipeline as in claim 2, wherein a wrapper is applied to the outer surface of the steel pipe to protect the pipe against electrolytic corrosion, reinforcing means secured to the outer surface of the steel pipe and extending into the layer of concrete, said reinforcing means comprising a plurality of axially spaced apart, circumferentially extending expanded metal rings secured to the outer surface of the pipe prior to application of the wrapper and concrete.

9. A composite pipeline as in claim 2, wherein a wrapper is applied to the outer surface of the steel pipe to protect the pipe against electrolytic corrosion, reinforcing means secured to the outer surface of the steel pipe and extending into the layer of concrete, said reinforcing means comprising a plurality of rings secured to the outer surface of the pipe, and a plurality of radially outwardly extending lugs on each of said rings.

10. A composite pipeline as in claim 2, wherein reinforcing means are embedded in said concrete and extend generally longitudinally of the pipe, and spacer means secured to the pipe and to the reinforcing means to hold the reinforcing means in spaced relation to the pipe.

* * * * *

UNITED STATES PATENT OFFICE
CERTIFICATE OF CORRECTION

Patent No. 3,955,600  Dated May 11, 1976

Inventor(s) Russell D. Tamburello

Figure 6:
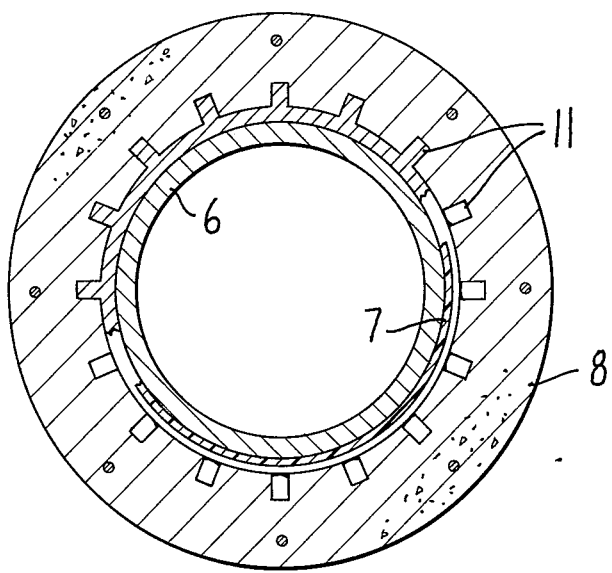
FIGS. 5, 6 and 7 are, respectively, sections taken through the structures shown in FIGS. 2, 3 and 4.
Figure 5:
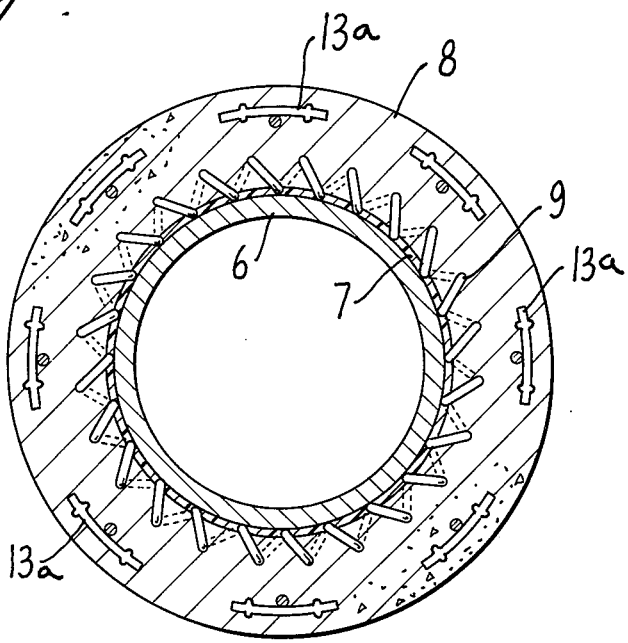
Figure 7:
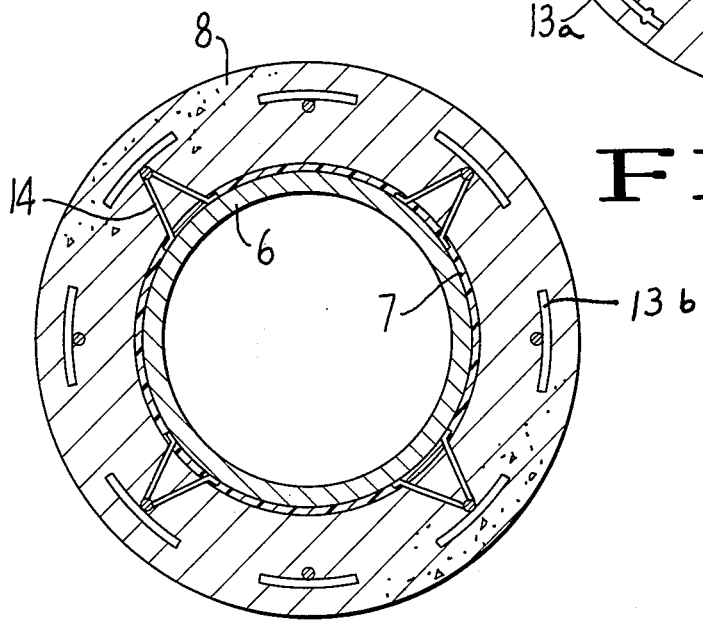

It is certified that error appears in the above-identified patent and that said Letters Patent are hereby corrected as shown below:

Column 1, lines 57-58, "Figs. 5, 6 and 7 are, respectively, sections taken through the structures shown in Figs. 2, 3 and 4" should read  Figs. 5, 6 and 7 are sections taken through pipeline structures similar to those shown in Figs. 2, 3 and 4.

Column 2, line 7, "Figs. 2, 3 and 4" should read Figs. 2 and 5.

Column 2, line 20, 13 was omitted after "at".

Column 3, line 44, second "a" should be an.

Signed and Sealed this

Twentieth Day of July 1976

[SEAL]

Attest:

RUTH C. MASON
Attesting Officer

C. MARSHALL DANN
Commissioner of Patents and Trademarks